US006860660B2

(12) United States Patent
Hochgesang et al.

(10) Patent No.: US 6,860,660 B2
(45) Date of Patent: Mar. 1, 2005

(54) KEYBOARD, PREFERABLY FOR ELECTRONIC PAYMENT TERMINALS

(75) Inventors: Gerhard Hochgesang, Bad Neustadt (DE); Andrzej Malinowski, Schweinfurt (DE); Klaus Schmoeger, Bad Neustadt (DE)

(73) Assignee: Preh-Werke GmbH & Co. KG, Bad Neustadt a.d. Saale (DE)

( * ) Notice: Subject to any disclaimer, the term of this patent is extended or adjusted under 35 U.S.C. 154(b) by 0 days.

(21) Appl. No.: 10/413,554

(22) Filed: Apr. 15, 2003

(65) Prior Publication Data

US 2004/0013456 A1 Jan. 22, 2004

Related U.S. Application Data

(60) Provisional application No. 60/375,406, filed on Apr. 26, 2002.

(30) Foreign Application Priority Data

Apr. 17, 2002 (DE) ........................................ 102 16 936

(51) Int. Cl.$^{7}$ ................................................ G06F 3/023
(52) U.S. Cl. ...................................................... 400/472
(58) Field of Search ................................ 400/472–496; 341/22; 345/168; 361/680

(56) References Cited

U.S. PATENT DOCUMENTS

| | | | | | |
|---|---|---|---|---|---|
| 4,905,173 | A | * | 2/1990 | Bianco | 361/680 |
| 5,421,659 | A | * | 6/1995 | Liang | 400/472 |
| 6,215,420 | B1 | * | 4/2001 | Harrison et al. | 341/22 |
| 6,312,175 | B1 | * | 11/2001 | Lum | 400/472 |
| 6,641,317 | B1 | * | 11/2003 | Tsau | 400/496 |
| 6,736,323 | B2 | * | 5/2004 | Hochgesang et al. | 235/475 |
| 2003/0147205 | A1 | * | 8/2003 | Murphy | 361/680 |
| 2003/0223797 | A1 | * | 12/2003 | Uke | 400/472 |

FOREIGN PATENT DOCUMENTS

| | | | | | |
|---|---|---|---|---|---|
| DE | 29510328 | U1 | | 11/1995 | |
| EP | 0263652 | A2 | | 4/1988 | |
| EP | 0943981 | A2 | | 9/1999 | |
| EP | 1172832 | A2 | | 1/2002 | |
| JP | 09265341 | A | * | 10/1997 | G06F/03/02 |

* cited by examiner

*Primary Examiner*—Daniel J. Colilla
(74) *Attorney, Agent, or Firm*—Birch, Stewart, Kolasch & Birch, LLP

(57) ABSTRACT

A keyboard having a housing, which is designed as one piece and wherein a top open housing shell is designed in conjunction with a keypad such that the top shell is traylike and is attached within the housing at an angle. A bottom base of the top open housing shell forms a bottom open housing shell. The bottom open housing shell has at least one recess provided for the installation of a card reader.

16 Claims, 2 Drawing Sheets

KEYBOARD, PREFERABLY FOR ELECTRONIC PAYMENT TERMINALS

This nonprovisional application claims priority under 35 U.S.C. § 119(a) on patent application Ser. No. DE 102 16 936.5 filed in Germany on Apr. 17, 2002, and under 35 U.S.C. §119(e) on Provisional Application No. 60/375,406, which was filed on Apr. 26, 2002, and which are both herein incorporated by reference.

BACKGROUND OF THE INVENTION

1. Field of the Invention

The present invention relates to a keyboard, preferably for electronic payment terminals.

2. Description of the Background Art

Known from EP 1 172 832 A2 is a generic keyboard for an electronic payment terminal with a one-piece keyboard housing. The housing has a top and a bottom housing shell, which join together in an essentially S-shaped manner. In the top housing shell, a keypad is held at an angle by diagonals. Arranged beneath the keypad, for example, are keyboard electronics. The bottom side or surface of the top housing shell is built flat relative to an imaginary support surface. Electrical connections for auxiliary assemblies extend into the top housing shell from the recesses in the bottom housing shell adjoining this surface.

SUMMARY OF THE INVENTION

It is therefore an object of the present invention to provide a simple keyboard that is designed to be easy to assemble and service, and optimized with regard to cost.

The invention is based on the concept of creating a one-piece housing, having a top and a bottom open housing shell, wherein the top open housing shell is designed in conjunction with a keypad such that the upper shell is traylike and is attached within the housing preferably at an angle. The bottom side or base of the top open housing shell is part of the bottom open housing shell.

The bottom open housing shell has an area for installation of a card reader and can be recognized within the top side of the housing as a projection or as a flat end to the housing. This area adjoins the shared surface, for example as a recess.

Additional recesses, which are provided in the bottom open housing shell, can likewise be recognized as flat ends to the top housing shell.

The preferred inclined position of the top housing shell achieves, among other things, that moisture, which enters, can run out through slots that can be built into the housing. The keypad is permanently attached to the bottom housing shell, but can also be removably attached thereto.

In a further embodiment of the invention, the bottom housing shell has a reinforcement in the area of the shared surface. In this way, high stability can be attained, which can be accomplished through a thicker surface, for example.

In a further embodiment, the reinforcement can be implemented through longitudinal and/or transverse ribs, which preferably have an H shape. In addition to the improvement in stability, the open spaces in the H shape provide opportunities to integrate electronic assemblies, such as a keyboard electronics unit, therein. Moreover, the above-described recesses in the bottom housing shell provide additional accommodation locations.

Because of the complex support within the tray of the top housing shell, the keypad can omit an otherwise necessary support plate, and, moreover, is optimized with respect to cost.

The housing itself is an injection molded plastic part. Moreover, the design of the housing makes it simple and cost-effective to manufacture.

The novel design of the keyboard housing and keypad make it possible to save materials and weight, without reducing stiffness and quality. Ease of service and assembly is improved, since, for example, the keypad need not be removed to replace the keyboard electronics, for example.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
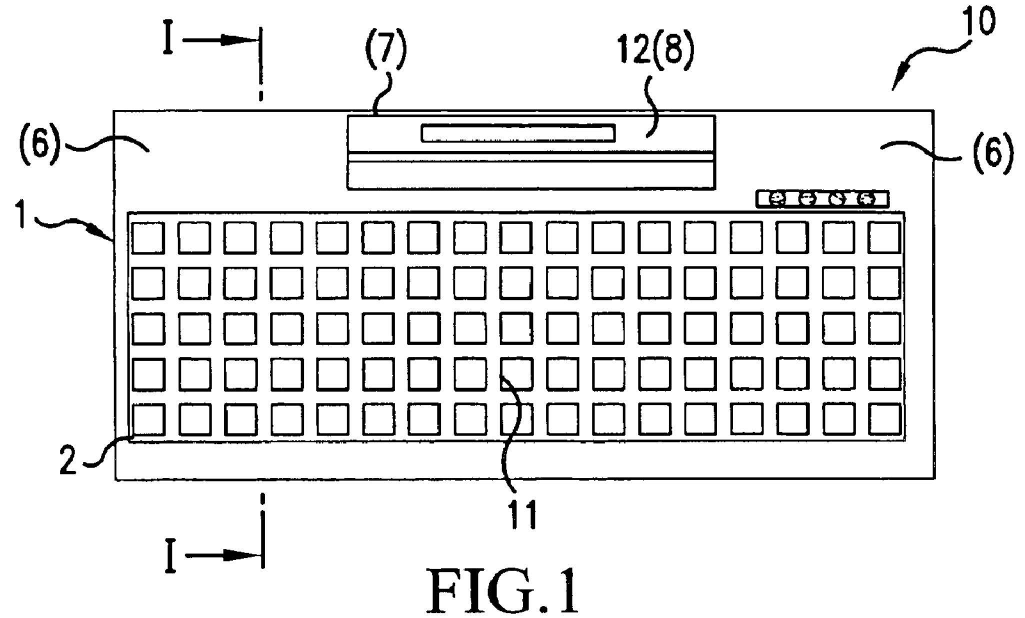
FIG. 1 is a top view of a keyboard according to a preferred embodiment of the present invention.

FIG. 1 shows a keyboard 10, for example of an electronic payment terminal for a POS (Point of Sale) terminal, in a top view. The keyboard 10 has a keyboard housing 1 with a keypad 11, which is held in the housing 1. The keyboard 10 may also have a card reader 12, which can be a magnetic stripe and/or chip card reader.

Figure 2:
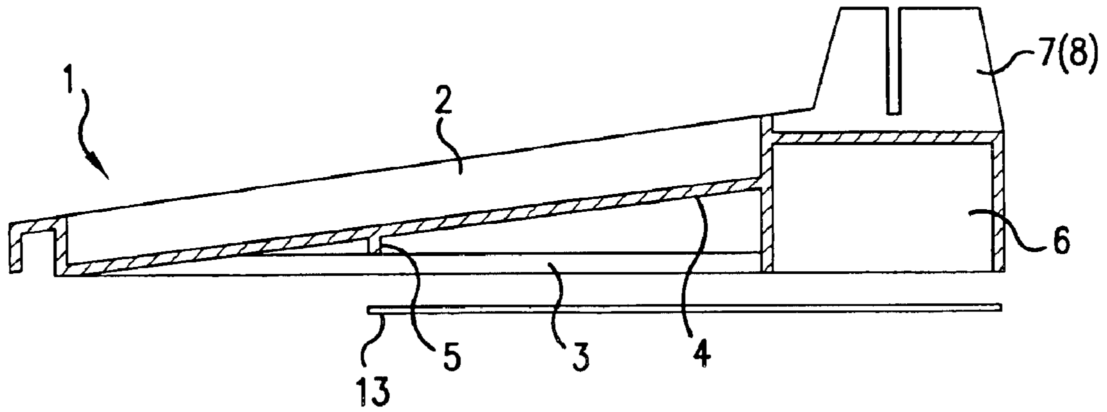
FIG. 2 is a cross-sectional view of the keyboard along cross-section I—I from FIG. 1, without the keypad.

The keyboard housing 1 preferably is made of plastic and is made of a one-piece base part that includes a top open housing shell 2 and a bottom open housing shell 3, as is shown in FIG. 2 in cross-section.

The top open housing shell 2 is traylike and is mounted or attached at an angle within the housing 1. The tray preferably contains no additional details that are part of the housing shell 2 so that the keypad 11 can lie flat or even only partially on a bottom surface 4 of the tray. The back of the bottom surface 4 of the tray is part of the bottom open housing shell 3, by which the top open housing shell 2 and the bottom open housing shell 3 combine to form a housing 1 that is approximately Λ (PIE) shaped. For better stability, the bottom open housing shell 3 has reinforcing ribs 5 below the bottom surface 4 of the top housing shell 2.

In this example embodiment the bottom open housing shell 3 has, adjoining the bottom surface 4 and the reinforcements 5, which, for example, run parallel to an imaginary support surface, two smaller recesses 6 and a larger central recess 7, which in particular can serve to accommodate electronic components such as auxiliary assemblies or plug-in connectors. In this embodiment, the cross sections of the two housing shells 2 and 3 then additionally form a Π (bucket) shape attached to the Λ shape. The central recesses 6 are preferably provided to accommodate an electronic unit 8 of the magnetic stripe and/or chip card reader 12. Like the recesses 6, the recess 7 can terminate the top housing shell 2 together with the housing edge formed by the tray.

Figure 3:
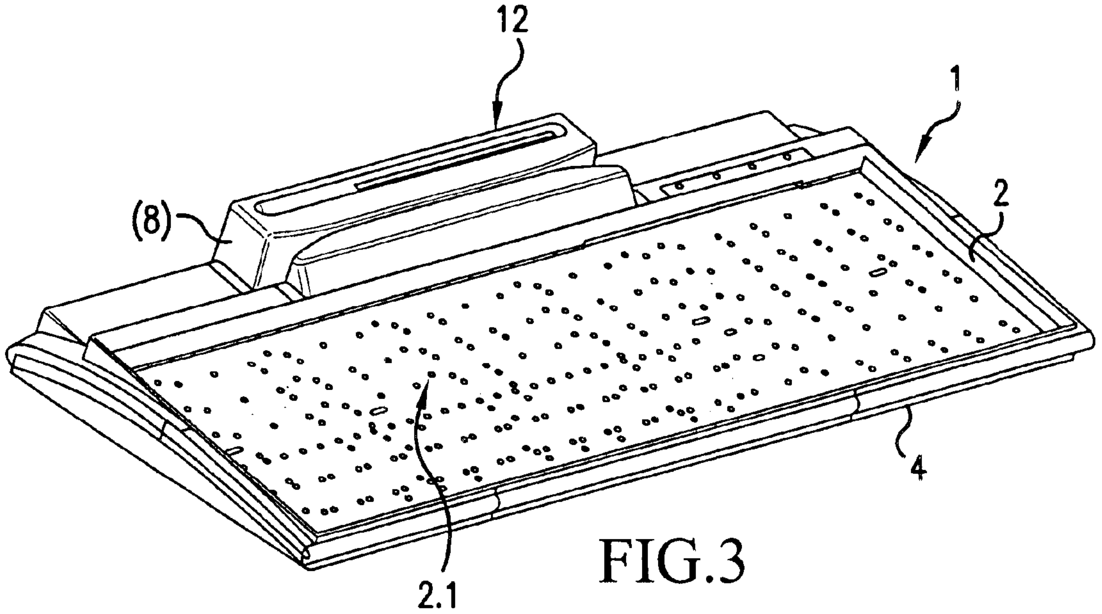
FIG. 3 is a perspective top view of the keyboard.

In FIG. 3, the keyboard housing 1 is shown in a perspective representation in a top view. The guide frame of the keypad 11 can be screwed, caulked, or otherwise attached to the bottom open housing shell 3 by openings 2.1, which pass from the top open housing shell 2 to the bottom open housing shell 3. The keypad 11 is designed such that it preferably fills the tray space completely. Because it lies flat or partially on the housing base part, a support plate, which would otherwise be needed, can be eliminated.

Figure 4:
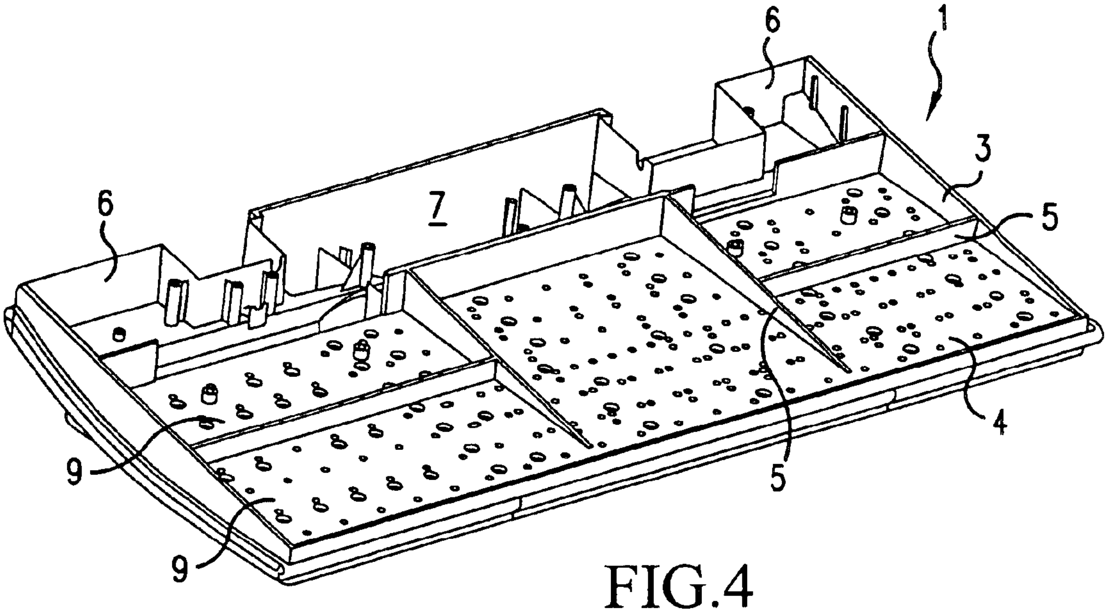
FIG. 4 is a perspective view of the bottom of the keyboard.

FIG. 4 shows the bottom view of the keyboard housing 1. The ribs 5, which provide for reinforcement, preferably form the shape of one or two H's. As a result of this shape, spaces 9 are created in which additional electronic assemblies (not shown) or the aforementioned assemblies can be accommodated. It is advantageous to integrate the keyboard electronics (not shown) in the bottom housing shell 3, in particular in one of the spaces 9. Electrical connection of the individual electronic assemblies, such as the keypad 11, to the appropriate corresponding parts, such as to the keyboard electronics, for example, is ensured.

The open bottom housing shell 3 is provided with a cover 13 in order to keep the electronic assemblies from falling out.

It is self-evident that further modifications are possible within the scope of the invention. Thus the card reader 12 may also be integrated to the side, next to the keypad 11. In addition, the cover 13 can be made of plastic. The, reinforcement can also be implemented in the form of a slight thickening, or by a thicker cross-section of the shared surface 4. The surface 4 can also extend so it is flat in the keyboard housing 1, in which case it is preferable that no spaces are formed beneath this surface. All of the electronics can then be accommodated in the recesses 6, 7.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A keyboard having a housing for accommodating at least a keypad, the housing being designed as one piece, the housing comprising:

an open top housing shell; and a bottom open housing shell, wherein the top open housing shell is traylike and its base forms part of the bottom housing shell, the base being inclined within the housing, so that the top open housing shell and the bottom open housing shell together form a Λ-shape portion, and wherein the top open housing shell and the bottom open housing shell, in cross-section, form a Π shaped portion being attached to the Λ shape portion, wherein the Π shaped portion includes an opening for receiving electrical components, said opening being located on a side of the Π shaped portion opposite to the top housing shell.

2. The keyboard according to claim 1, wherein reinforcements are provided on a surface of the bottom housing shell.

3. The keyboard according to claim 2, wherein the reinforcements are implemented through ribs.

4. The keyboard according to claim 2, wherein the reinforcements are implemented by increasing the thickness of the surface.

5. The keyboard according to claim 3, wherein the ribs form an H-shape.

6. The keyboard according to claim 1, wherein the keypad is attached to the bottom housing shell via openings.

7. The keyboard according to claim 1, wherein the keypad lies on the surface of the top open housing shell.

8. The keyboard according to claim 1, wherein in the bottom housing shell adjoining a card reader receiving area is provided, the card reader receiving area being formed, within the top housing shell, as a projection or as a flat end to the housing.

9. The keyboard according to claim 1, wherein recesses are provided for accommodating electronic components, the recesses being formed in the bottom open housing shell.

10. The keyboard according to claim 1, wherein electronic components are mounted from a side from by the bottom open housing shell, the side being opposite to the open top housing shell.

11. The keyboard according to claim 1, wherein the keyboard is an electronic payment terminal.

12. A keyboard comprising:

a housing being formed as one-piece, the housing having an upper portion and a lower portion, wherein the upper portion includes a keyboard receiving region having openings formed therein for fixedly receiving a keyboard directly thereon, wherein the lower portion includes reinforcing ribs, which are tapered, the reinforcing ribs being provided on a bottom surface of the keyboard receiving region, and wherein the lower portion further includes recesses formed therein for receiving electrical components.

13. The keyboard according to claim 12, wherein the electrical components include a magnetic card or chip reader.

14. The keyboard according to claim 12, wherein the recesses form a receiving portion for a magnetic card or chip reader, such that the receiving portion is integrated with the housing.

15. The keyboard according to claim 12, wherein the tapered reinforcing ribs are formed such that the keyboard receiving region, and thereby the keyboard, is inclined during operational use of the keyboard.

16. The keyboard according to claim 12, wherein the keyboard is formed by injection molding.

* * * * *